United States Patent [19]

Skoch et al.

[11] 4,171,385

[45] Oct. 16, 1979

[54] ANIMAL FEED BLOCK CONTAINING MAGNESIUM OXIDE

[75] Inventors: Leroy V. Skoch, Manchester; Dean E. Hodge, St. Louis, both of Mo.

[73] Assignee: Ralston Purina Company, St. Louis, Mo.

[21] Appl. No.: 893,734

[22] Filed: Apr. 5, 1978

[51] Int. Cl.$^2$ ............................................. A23K 1/02
[52] U.S. Cl. .................................... 426/658; 426/69; 426/74; 426/623; 426/630; 426/807
[58] Field of Search ............... 426/648, 658, 623, 630, 426/635, 656, 807

[56] References Cited

U.S. PATENT DOCUMENTS

| | | | |
|---|---|---|---|
| 4,016,296 | 4/1977 | DeSantis | 426/807 |
| 4,027,043 | 5/1977 | Schroeder | 426/658 |

*Primary Examiner*—R. B. Penland
*Attorney, Agent, or Firm*—W. Dennis Drehkoff

[57] ABSTRACT

An animal feed supplement in a solid, weather resistant block form and method of making is disclosed. The molasses based feed supplement block, intended for consumption primarily by ruminant animals, although not limited thereto, contains magnesium oxide as a blocking agent. The feed supplement also comprises a water absorbent clay, a phosphorous source and an edible fat or oil in sufficient quantities to set into a solid block in a relatively short period of time at ambient temperatures. A preferred block composition is prepared by a method which comprises admixing the molasses, water, phosphorous source and water absorbing clay under high speed shearing action for an effective amount of time to disperse the clay, admixing edible fat and dispersing it in the mixture and then admixing magnesium oxide to obtain a viscous nutrient mixture that thickens quickly. The mixture is then poured into molds or packages and solidifies to form a hard depackagable block.

10 Claims, No Drawings

ANIMAL FEED BLOCK CONTAINING MAGNESIUM OXIDE

BACKGROUND OF THE INVENTION

This invention relates primarily to an animal feed supplement and, more particularly, to improvements in an animal feed supplement in block form and the attended method of preparation where the ingredients set into a solid block form within a relatively short period of time.

A common practice today is to feed animals supplemental feedstuffs or mixed rations which have been fortified with nutritive elements. The feedstuffs have been developed in block form to permit free choice feeding and reduce the labor required for mixing the nutritive supplement with the animals' feed ration. Serving as an illustration of the prior art are salt blocks, mineral blocks, protein blocks and molasses blocks.

It is known in the art to prepare hard, animal feed blocks by, for example, (a) compressing and molding a mix of hay, straw, grains and the like, with or without molasses, to a desired shape and weight or (b) evaporative heating of the ingredients. The heating may oxidize or decompose heat sensitive ingredients wherein the compressed blocks have limited amounts of energy supplying ingredients. Additionally, there are modifications of method (b), showing heating and/or emulsifying agents to disperse the energy supplying ingredients. U.S. Pat. No. 3,420,672 discloses the use of gelatinized starch as an emulsifying agent in the preparation of solid, animal feed emulsions containing molasses, fatty material, urea, phosphate, bentonite and other ingredients. U.S. Pat. No. 4,016,296 shows the use of calcium oxide with a fatty acid to form a concentration of hard soap in the feed block in order to impart hardness to the block. U.S. Pat. No. 4,027,043 discloses a molasses block containing a fat emulsifying agent and a heating step in its method of preparation to disperse the solid ingredients into the liquid ingredients.

It is accordingly believed there is a need for an economical, nutritionally balanced, hard, animal feed supplement in block form containing energy supplying ingredients that can solidify at ambient temperatures in a relatively short period of time.

SUMMARY OF THE INVENTION

It is an object of the present invention to provide a novel animal feed supplement composition which embodies molasses as the major ingredient in a solid, weather resistant block form.

Another object of the invention is to provide a hard animal feed block containing energy supplying ingredients without emulsifying agents to disperse and suspend the energy supplying ingredients.

Another object of the invention is to provide a hard, weather resistant animal feed block which contains molasses as a major ingredient and provides a suitable medium or carrier for a variety of additional feed supplement materials, including but not limited to protein in the natural plant form, such as soy flakes, dehydrated alfalfa, cottonseed meal, wheat midds, soybean meal, and corn, etc; and non protein nitrogen sources such as urea, biuret, ammonium sulfate, etc.; salt, fat in a variety of forms, fiber sources such as rice hulls, cottonseed hulls; sugar, magnesium, calcium, clay, phosphorous and various trace elements.

And yet, another object of this invention is to provide a solid, weather resistant molasses based animal feed block which can serve as a medium or carrier for medicaments, hormones, vitamins, minerals, antibiotics, insecticides or anthelmintics for animals with ruminant or non-ruminant digestive systems.

Another object of the present invention is to provide a novel method of making the animal supplement composition which includes the steps of providing a supplement mixture containing molasses as a major ingredient and utilizing a blocking agent, magnesium oxide, to give the composition a hard, solid structural character. The block composition is prepared by a method which comprises admixing a major portion of molasses, water, phosphorous source and water absorbent clay under high speed shearing action for an effective amount of time to disperse the clay, admixing edible fat and dispersing it in the mixture and then admixing magnesium oxide to obtain a viscous nutrient mixture. The mixture can then be poured into molds or packages and solidifies within a relatively short period of time to form a solid hard, weather resistant block.

These and other objects and advantages will become apparent hereinafter.

DETAILED DESCRIPTION OF THE INVENTION

A typical formulation for the product obtained in accordance with the invention comprises the following nutritive ingredients:

| INGREDIENTS | % BY WEIGHT |
|---|---|
| Molasses | 18–74 |
| Mono-Ammonium phosphate | 0–5 |
| Ammonium Polyphosphate | 2–8 |
| Attapulgite Clay | 0.5–5.0 |
| Water | 10–30 |
| Fat Source | 5–30 |
| Magnesium Oxide | 5–20 |

It's also possible to add other nutritive ingredients that can be dispersed and suspended in the above formulation to create a diverse animal feed supplement. Forms of natural protein such as grains, spent soy flakes, soybean meal, cottonseed meal, peanut meal and non-protein nitrogen sources such as urea as well as various other additives may be included in the formulation such as medicaments, hormones, vitamins, minerals, antibiotics, insecticides and anthelmintics. Dry ingredients may be present in amounts ranging from about 0 to about 15% by weight.

Molasses, which is the major ingredient of the composition, can be any commercial molasses product. The molasses can be any of the sugar containing molasses such as those obtained as the by products of the processing of sugar beets, sugar cane, corn or wood. Exemplary of these are blackstrap molasses, converted molasses, wood sugar molasses, hydrol syrup, citrus molasses and the like. Molasses has varying amounts of solids which affect its viscosity and the measure of the amount of such solids is normally given in terms of Brix. With no intention to limit the present invention, for the consistency of the molasses that may be used has a wide variance, the Brix of commercially available molasses which may be used in the invention normally falls within the range of 60° to 90° Brix. The concentration of the molasses in the process and product of this invention is generally from about 18 to 74% by weight and preferably from about 40 to 60 percent by weight.

With respect to the clay constituent in the formulation, it is generally present in the process and product in amounts ranging from about 0.5 to about 5.0% by weight and preferably in an amount from about 1.0 to 1.5% by weight. The clay should be water absorbent and those that can be employed include attapulgite clay, bentonite, kaolin and mixtures thereof. Attapulgite clay is preferred although satisfactory results are obtained with all the aforementioned clays. The function of the clay is believed to be a suspending agent which upon high speed shear mixing suspends and prevents segregation of the other ingredients of the formulations throughout the mixture which sets into a hard animal feed block.

The phosphorous source should be water soluble and added to the nutrient block formulation in an amount effective to aid in dispersing the water absorbent clay in such a manner to fully utilize its capabilities as a suspending agent. A preferable phosphorous source is ammonium polyphosphate and is desirably present in amounts ranging from about 2 to about 8% by weight. Another phosphorous source that is particularly suitable is tetrasodium pyrophosphate and is preferably present in the block formulation in amounts ranging from about 1 to about 6% by weight. For nutritional purposes, monoammonium phosphate can be added to the nutrient block formulation in amounts ranging from about 0 to about 5% by weight.

The fats which may optionally be added to the nutrient block formulation include livestock, edible animal and vegetable fats and oils such as soybean oil, cottonseed oil, fish oil, grease, bleachable fancy tallow, yellow grease, beef fat and the like. The fat source used in the present invention provides energy to the animal as well as aids in the blocking process. It is present in amounts ranging from about 5 to about 30% by weight.

A critical ingredient in the nutrient block formulation is magnesium oxide. The function of magnesium oxide in the block formulation is not completely understood, but it is believed to have water binding properties to facilitate the formation of a hard feed block. It should be present in the formulation in an effective amount to set the nutrient block within one hour. Preferably, the amount should range from about 4 to about 20% by weight.

The interactions of water and the ingredients in the animal feed supplement are unusual. At the stated added water content of about 5-20% by weight and a molasses content of about 18 to about 65% by weight, there is sufficient free water available to aid in the convenient preparation of the block. The formulation has liquid flow properties when being mixed and becomes hard upon mixing with magnesium oxide. The water activity ($A_w$) of the block should be at least 0.80 and not more than about 0.90. Water activity ($A_w$) is defined as the ratio of the vapor pressure exerted by the water contained in the block formulation (P) to the vapor pressure of pure water ($P_o$) at the same temperature. Water activity also can be defined as the equilibrium relative humidity (ERH) in which a food would neither gain nor loose moisture. In equation form this becomes:

$$A_w = P/P_o = ERH/100$$

The $A_w$ for pure water at any temperature above its freezing point is 1.0. The $A_w$ of any food material will be in the range of 0–1.0. The $A_w$ of conventional animal feed supplements in block form range from about 0.30 to 0.60. The $A_w$ of the present feed supplement can be in the range of about 0.80 to about 0.90. Of course, the more dry ingredients included in the product, the lower the water activity will be. The animal feed supplement in block form of the instant invention has shown stability for long periods of time, at least six months, when stored at ambient temperatures or in the field.

In accordance with the practice of the present invention, a typical process for making an animal feed block comprises mixing water, about 18 to 74% by weight molasses, and about 2 to 8% ammonium polyphosphate, and about 0.5 to 5% by weight water absorbent clay, preferably attapulgite, under high speed shearing action for an effective amount of time, preferably about 2 minutes, to disperse the clay, admixing animal fat, about 0 to 15% by weight during ingredients, such as vitamins, minerals etc., and possibly natural protein or nonprotein nitrogen sources and then adding about 5 to about 20%, preferably 6% by weight magnesium oxide to obtain a viscous nutrient mixture that can be poured into containers and solidifies to form a hard weather resistant block.

The following are examples of some of the products which can be produced in accordance with the invention. It is to be understood that the process and products are given by way of example only, and not by way of limitation.

EXAMPLE I

This example illustrates the preparation of the animal feed block of the instant invention with varying amounts of magnesium oxide and molasses. The ingredients were mixed in a Waring blender in the following manner: The molasses, water, ammonium polyphosphate and clay were subjected to high speed shearing action for 2 minutes. Subsequently, the other ingredients were added with mixing and the magnesium oxide was added last in order and the nutrient mixture was poured into molds. All percentages are by weight.

| FORMULATION | BLOCK | | | | | |
| --- | --- | --- | --- | --- | --- | --- |
|  | A | B | C | D | E | F |
| Magnesium Oxide | 0 | 6.0 | 12.0 | 24.0 | 36.0 | 48.0 |
| Ammonium Polyphosphate | 5.0 | 5.0 | 5.0 | 5.0 | 5.0 | 5.0 |
| Molasses (79.5 (Brix) | 72.6 | 66.1 | 60.1 | 48.1 | 36.1 | 24.1 |
| Attapulgite Clay | 1.5 | 1.5 | 1.5 | 1.5 | 1.5 | 1.5 |
| Bleachable Fancy Tallow | 5.0 | 5.0 | 5.0 | 5.0 | 5.0 | 5.0 |
| Phenothiazine (Anthelmintic) | 1.44 | 1.44 | 1.44 | 1.44 | 1.44 | 1.44 |
| Water | 15.0 | 15.0 | 15.0 | 15.0 | 15.0 | 15.0 |

As the level of magnesium oxide increases the amount of phosphorous source may also increase to form a hard depackagable block. For practical purposes, large amounts of magnesium oxide are not required for normal applications of the block.

The formulations were given an opportunity to set into depackagable blocks at room temperature.

A did not set into block form.

Formulation B set in 14 days and formulation C in 4 days. The remainder of the formulations set in 1 day. However, formulations D, E and F were considered too hard for practical purposes and unpalatable.

EXAMPLE II

Formulation B of the previous example was prepared in accordance with the described process. However, after mixing and pouring into molds it was placed in a room with a temperature of 110° F. and it set into a depackagable block within six days.

The same formulation with 1, 3, and 6% by weight tetrasodium pyrophosphate substituted for ammonium polyphosphate resulted in set up times of 11 days, 9 days, and 9 days respectively. When these formulations were produced and placed in a temperature of 110° F. they set into a depackagable block form in 48 hours.

EXAMPLE III

Formulation B of Example I was prepared with bentonite substituted for attapulgite clay at levels of 2 and 5%. The molasses content was adjusted accordingly. The nutrient mixture set into hard depackagable blocks in 15 days.

EXAMPLE IV

The following formulation was prepared and fed on an ad lib basis to two groups of 20 head of mature cows weighing approximately 1000 lbs each. The test lasted for 100 days and other feed sources were available such as grass hay and pasture.

| INGREDIENTS | % BY WEIGHT |
| --- | --- |
| Water | 15.0 |
| Molasses | 31.0 |
| Salt | 3.0 |
| Ammonium Polyphosphate | 6.0 |
| Attapulgite Clay | 1.5 |
| Calcium Carbonate | 4.5 |
| Trace Mineral CLS | 0.2 |
| Vit. A-D | .0085 |
| Bleachable Fancy Tallow | 10.0 |
| Ground Soybean Meal, 49% | 15.0 |
| Magnesium Oxide | 6.0 |

The average consumption for each cow amounted to 2.5 lbs per head per day.

EXAMPLE V

The following ingredients were mixed in a VAC-U-MAC® turbine mixer with a tip speed of approximately 5250 ft/min.
(a) water—15.00%
(b) molasses—40.00%
(c) ammonium polyphosphate—5.00%
(d) monoammonium phosphate—2.60% and mix 15 seconds
(e) attapulgite clay—1.50% and mix 2 minutes
(f) urea—3.15% and mix 15 seconds
(g) calcium carbonate—5.55% and mix 15 seconds
(h) animal fat—5.00% and mix 15 seconds
(i) vitamin A-D concentrate—0.011%
(j) trace mineral D—0.2% and mix 15 seconds
(k) salt—1.00%
(l) dehulled soybean meal—14.989% and mix 30 seconds
(m) magnesium oxide—6.00% and mix 3 minutes The nutritive mixture was poured into containers and placed in a room heated to 110° F. and set into a hard depackagable weather resistant block within 48 hours.

The block was placed in the field and remained stable for over six months.

These blocks were also fed to young heifers who had hay and silage as additional feed sources. The study lasted eight weeks, and divided into two four week periods, (I) and (II).

| DATA SUMMARY | | |
| --- | --- | --- |
| | PERIOD I | PERIOD II |
| Initial Weight (lb) | 871 | 904 |
| Daily gain (lb) | 1.18 | 1.61 |
| Block intake (lb) | 4.26 | 3.96 |
| Corn silage intake (lb) | 35.0 | 35.3 |
| Alfalfa hay intak (lb) | 5.13 | 7.62 |
| NO. of heifers | 12 | 12 |

The heifers accepted the block and gained weight satisfactorily.

It appears from the foregoing data that the animal feed block of the present invention is palatable and serves as an effective nutrient source and carrier for medicaments.

What is claimed is:

1. A process for preparing a molasses based feed block which comprises: admixing about 18 to 74% by weight molasses, a water soluble phosphorous source selected from the group consisting of ammonium polyphosphate and tetrasodium pyrophosphate, about 0.5 to 5% by weight water absorbent clay and 5–30% water under high speed shearing action for an effective amount of time to disperse the clay, admixing about 5 to 30% by weight animal fat and magnesium oxide in an amount effective to obtain a viscous nutrient mixture that solidifies to form a hard weather resistant block said block having a water activity of 0.8 to 0.9.

2. The process of claim 1 wherein the magnesium oxide is present in amounts ranging from about 5 to about 20% by weight.

3. The process of claim 1 wherein the magnesium oxide is present in the amount of about 6% by weight.

4. The process of claim 1 wherein the phosphorous source is ammonium polyphosphate in amounts ranging from about 2 to about 8% by weight.

5. The process of claim 1 wherein the phosphorous source is tetrasodium pyrophosphate in amounts ranging from about 1 to about 6% by weight.

6. An animal feed block comprising about 18 to 74% by weight molasses, 1 to 8% of a phosphorous source selected from the group consisting of ammonium polyphosphate and tetrasodium pyrophosphate, about 0.5 to 5.0% water absorbent clay, 5 to 30% water, about 5 to 30% fat and an effective amount of magnesium oxide to set the ingredients into a block, said block having a water activity of from 0.8 to 0.9 and being solid, weather resistant and palatable.

7. The composition of claim 6 wherein the phosphorous source is ammonium polyphosphate in amounts ranging from about 2 to about 8% by weight.

8. The composition of claim 6 wherein the phosphorous source is tetrasodium pyrophosphate in amounts ranging from about 1 to about 6% by weight.

9. The composition of claim 6 wherein the fat source is selected from the group consisting of livestock edible animal and vegetable fats and oils.

10. The composition of claim 6 wherein dry ingredients are present in amounts ranging from about 0 to 15% by weight.

* * * * *